July 18, 1972   C. G. PICKETT ET AL   3,677,866
DISPENSER FOR DISPOSABLE TYPE THERMOMETERS
Filed March 4, 1971
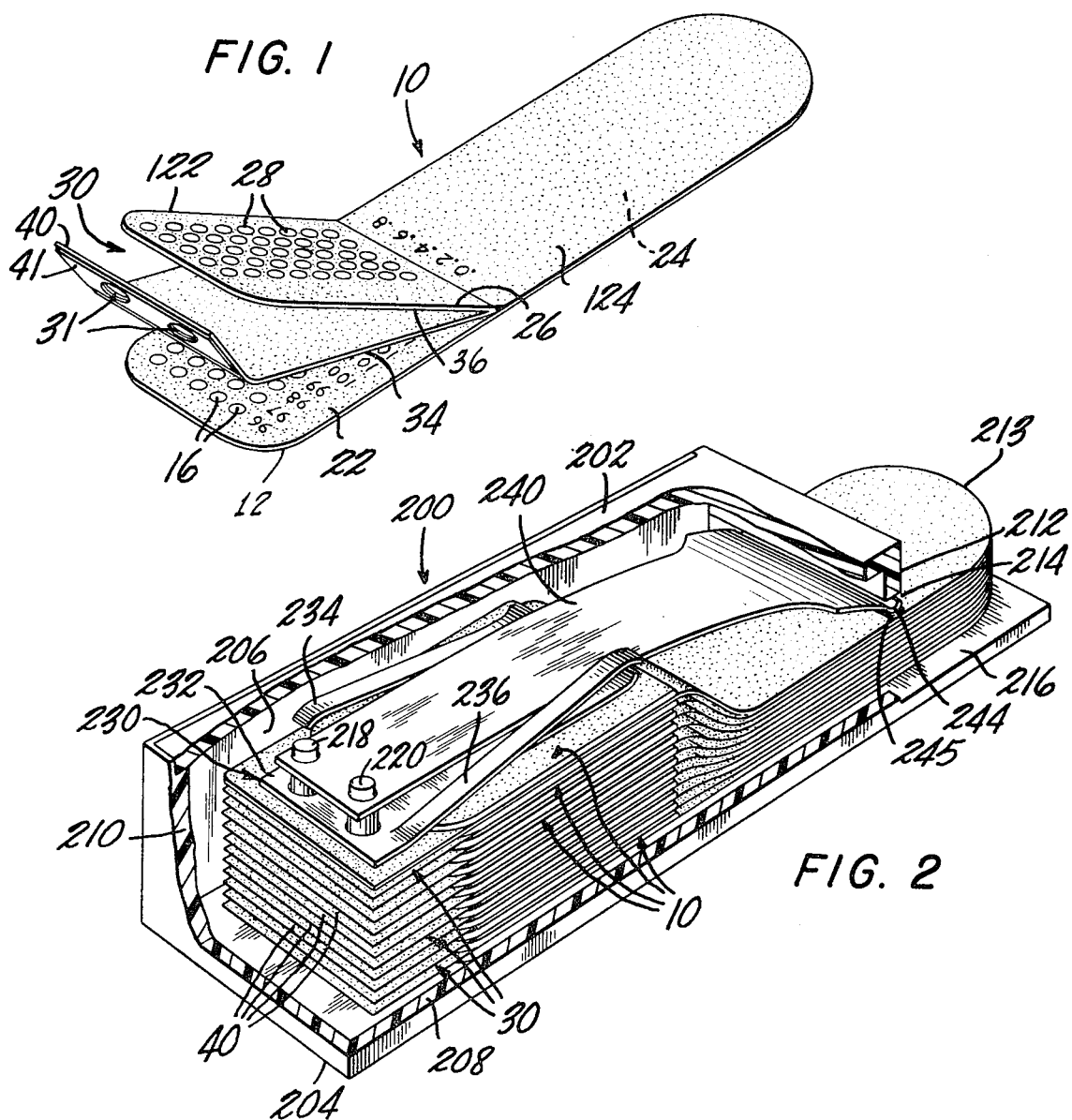
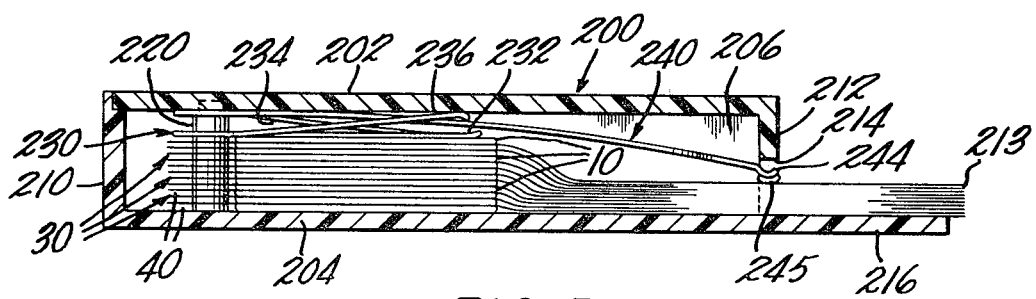

United States Patent Office 3,677,866
Patented July 18, 1972

3,677,866
DISPENSER FOR DISPOSABLE TYPE THERMOMETERS
Charles G. Pickett, Andover, Robert A. Lang, East Hanover, and Robert C. Comers, Rockaway, N.J., assignors to Bio-Medical Sciences, Inc., Fairfield, N.J.
Filed Mar. 4, 1971, Ser. No. 120,996
Int. Cl. B65d 83/08; B65h 3/58
U.S. Cl. 156—584
11 Claims

ABSTRACT OF THE DISCLOSURE

A dispenser is provided for use with thermometers of the type having a thermally sensitive substance on a thermally conductive sheet and an overlying transparent film carrying indicator means which are superpositionably registrable with the thermally responsive substance to denote temperature change upon change of state in the substance, which thermometer normally is provided with a removable shield interposed between the substance and the indicator means to prevent communication between the two until the thermometer is ready for use. The dispenser provides a housing in which one or more thermometers can be received with a tab part of the shield of each thermometer secured to an anchorage within the dispenser. The dispenser also includes an opening through which a portion of each thermometer can be extended for grasping the latter for removal or dispensing of each thermometer, the pulling action of removing the thermometer initiating peeling away of the shield from the thermometer within the dispenser. The dispenser also includes means at or adjacent the opening thereto which applies during dispensing, a wiping or pressing force to the transparent film on which is carried the indicator means to press the transparent film into contact with the carrier sheet positioning the indicator means in proper overlying communicating registration with the temperature responsive substance on the carrier sheet.

BACKGROUND OF THE INVENTION

In the concurrently filed application of Robert A. Lang entitled "Disposable Type Thermometer," Ser. No. 120,-995, filed Mar. 4, 1971 there is described a thermometer having a thermally sensitive substance deposited on a thermally conductive sheet and an overlying transparent film carrying indicator means which cooperate with the thermally responsive substance to denote specified temperatures upon change of state of the substance, the thermometer being provided with a readily removable flexible shield interposed between the thermally responsive substance and indicator means to prevent communication and reaction between the two until the thermometer is actually required for use. The shield is readily removably adhesively secured to the transparent film and can be peelably removed therefrom by pulling action applied digitally to the pull tab at one end of the shield. It is preferable that such types of thermometers be packaged in reasonable quantities in a dispenser because of the convenience such devices provide respecting storing the thermometers until required for use as well as the facility they offer for maintaining the thermometer in sterile condition up to the time of actual use where such thermometers are to be used with human test subjects.

SUMMARY OF THE INVENTION

The present invention is concerned generally with an improved dispenser for storage and dispensing of disposable chemical type thermometers. It is particularly concerned with providing dispensers for use with thermometers of the character described in the aforementioned concurrently filed application of Robert A. Lang.

The present invention provides a dispenser in which thermometers having shields made in accordance with the aforementioned patent application can be packaged in quantities of as many as a dozen or more to allow for protective storage of the thermometers prior to use but make them readily operatively available when needed. The dispenser in a particularly convenient embodiment thereof is comprised of a housing receiving the thermometers and in which is provided an anchorage in the form of one or more posts on which can be received the tab ends of the shields of the several thermometers disposed in the dispenser. The thermometers preferably are received in the dispenser in superposition stacked one upon another, being housed over a major portion of their length within the dispenser with only a minor tip end part of each thermometer extending through an opening in the dispenser. The dispenser also may include a blade spring supported on the top of the stack of thermometers and effective to apply a biasing force for applying pressure downwardly of the stack of thermometers to maintain them in secure stacked position. Dispensing of a thermometer is effected by grasping the tip end thereof extending through the opening in the housing and applying a pulling force thereto. Such force application causes the thermometer to be slid outwardly of the housing through the opening with the shield thereby being peelably removed from its position intermediate the transparent film and thermally conductive sheet. Positioned within the dispenser housing is a spring blade mounted and constructed to apply a biasing wiping or pressing force against the transparent film of the thermometer at a location along the course of sliding travel of the thermometer but before it exits through the opening in the dispenser. Such wiping force is employed to press the transparent film against the thermally conductive sheet, reseal it, and properly superpose the indicator means carried at the underface of the film in register with the thermally responsive substance carried in the cavities formed in the thermally conductive sheet.

The invention, accordingly, comprises the dispenser possessing the features, properties and relation of elements which will be exemplified in the device hereinafter described and the scope of the present invention will be indicated in the claims.

BRIEF DESCRIPTION OF THE DRAWING

Other objects of the invention will be in part obvious and will in part appear from the following detailed description taken in conjunction with the accompanying drawing, wherein like reference numerals identify like parts throughout and in which:

FIG. 1 is a perspective view of a thermometer of the type with which the dispenser of the present invention can be used, the temperature indicating end of the thermometer being opened and the tab of the shield being folded outwardly thereof.

FIG. 2 is a perspective view of the dispenser, there being disposed therein a quantity of thermometers, the dispenser embodying means therein for peelably removing the shield from each of the respective thermometers when dispensing the same for use, a substantial portion of the dispenser housing being broken away for clarity in depicting the interior construction of the same.

FIG. 3 is a side elevational view in section of the dispenser shown in FIG. 2.

DESCRIPTION OF THE PREFERRED EMBODIMENT

A type of disposable thermometer with which the dispenser of the present invention is used is shown in FIG. 1. Such thermometer 10 is comprised of a thermally conductive sheet 12 provided at an end portion or indicator section 22 with a matrix of depressions in each of which is contained a thermally responsive substance 16, the other portion of the sheet 12 providing a handle section 24. Coextensive and superposed with the sheet 12 is a transparent film 26 which has an indicator section portion 122 and is provided with an adhesive underface to which is secured a corresponding matrix of indicator means 28 cooperative with the thermally responsive substance when in communication with the latter and when a change of state occurs in such substance to evidence such state change and hence signal precise temperature values. The transparent film 26 also has a handle section portion 124 adhesively secured to handle section 24. Intervening indicator sections 22 and 122 is a shield 30 which prevents face-to-face contact of such sections and operative communication between the thermally responsive substance 16 and indicator means 28 until the thermometer is required for use, the shield being peelably removable to permit the indicator sections 22, 122 to be pressed into face-to-face contact when the thermometer is to be used. The shield 30 is a flexible sheet having a number of folds therein providing a first portion 36 coextensive with indicator section 122 of the transparent film 26 and being removably adhered thereto, a second portion 34 coextensive with indicator section 22 of sheet 12 and a third portion 40 providing a tab for peelably removing the shield from between indicator sections 22 and 122, the tab desirably having several openings 31 therethrough and being provided further with a reinforcing tape 41 to prevent tearing of the tab 40 from portion 34 during dispensing.

The construction of thermometer 10 and employment therein of a protective shield 30 to render it inoperative until required for use coupled with the need for resealing the transparent film 26 to the thermally conductive sheet 12 so as to insure accurate registration of the indicator means 28 with the thermally responsive substance 16 along with the demand that reasonable quantities of thermometers be readily available for use makes it desirable that the thermometers be packaged in a special dispenser such as the dispenser 200 depicted in FIGS. 2 and 3 and now to be described.

Dispenser 200 conveniently is formed of plastic material and is comprised of a housing having a top wall 202, a bottom wall 204, a pair of side walls 206, 208 and a pair of end walls 210, 212, the respective walls together defining an enclosure wherein can be received one or more thermometers 10 preferably arranged in a vertically superposed stack of thermometers one upon another, the indicating ends of the thermometers being positioned in the housing with the tip ends of the handles thereof extending outwardly of the dispenser through an opening 214 in end wall 212 as at 213 and being supported on an extension piece 216 of bottom wall 204. The thermometers 10 can be received in the dispenser with the tabs 40 of the respective thermometer shields 30 folded outwardly beyond the tip ends of the indicator ends thereof, the tabs 40 being staked by means of openings 31 on an anchorage means in the dispenser remote from opening 214, the anchorage means being provided in the form of a pair of posts 218, 220 upstanding from bottom wall 204. Such holes 31 in the tabs along with the posts 218, 220 in addition to holding the shield during dispensing provide means for maintaining the stack of thermometers properly positioned in the dispenser. Overlying the indicator ends of the thermometer 10 and resting on the uppermost thermometer in the stack, is a first pressing means or pressure plate 230 which has a flat main body part 232 received loosely over posts 218, 220 in the manner shown and which has at the side margins thereof a pair of spring fingers 234, 236 connected with or formed integral with the main body part 232, such spring fingers extending upwardly into engagement with the undersurface of top wall 202 to urge the main body part downwardly toward bottom wall 204 thereby to apply a pressing force against the indicator ends of the thermometer and compress the stack into the closely confined condition shown in FIGS. 2 and 3. Also provided in the dispenser is a blade spring 240 which is an elongated relatively thin component formed of spring material and having one end connected with posts 218, 220 with the other end extending toward and locating at the exit opening 214 in a downwardly curving or arcuate course as best seen in FIG. 3 with said other end terminating in a laterally widened wiping bar 244. The wiping bar 244 due to the spring biasing character of the blade spring applies a downwardly directed biasing force to the thermometers in the stack at a location along the course of sliding travel of the uppermost thermometer in the stack before it passes through opening 214 for the purpose of pressing the transparent film indicator section 122 of each thermometer into face-to-face contact with the indicator section 22 of the thermally conductive sheet 12 during dispensing. To insure application of pressure uniformly across, i.e., transversely of the course of sliding travel of the thermometers during dispensing, the wiping bar is provided with a resilient material, e.g., rubber pad 245 which provides a wiping surface which readily conforms with the surface contour of the thermometers so as to apply pressure uniformly across the full width thereof.

In using the dispenser 200 to dispense a thermometer 10 in an operative condition, the user merely grasps the handle end portion of the uppermost thermometer where it extends through opening 214 and applys a pulling force thereto. Since the shield tab 40 of such uppermost thermometer is fixed to posts 218, 220, such pulling force will initiate peeling of the portion 36 of shield 30 from the indicator section 122 of transparent film 26 in a direction away from the handle section 124. As the thermometer exits the dispenser, the wiping bar 244 and pad 245 of blade spring 240 will reseal the transparent film indicator section 122 against the thermally conductive sheet indicator section 22 and press the indicator means 28 into registered superposition and operative association with the thermally responsive substance on such sheet.

Thus, it will seen from the foregoing description that the present invention provides a dispenser for disposable type thermometers which is simple in construction and practical and convenient when used for its intended purpose. Moreover, the fact that the indicating ends of the thermometers are housed within the dispenser with only a very short tip end portion of the handle ends extending outwardly of the dispenser housing reduces the likelihood of inadvertent contamination of the indicating ends of the thermometers before use when the same are intended for human testing purposes.

What is claimed is:

1. A dispenser for holding and dispensing generally flat articles each of which prior to dispensing is comprised of at least two superposed, coextensive strips joined in adhesive face-to-face contact along corresponding first portions of the length of each, the remaining portions of the lengths of said strips being intervened by a shield peelably removably secured to the remaining portion of at least one of said strips for preventing face-to-face contact of said remaining portions and components carried on each of said remaining portions which components have an operative association when said remaining portions are pressed into face-to-face contact, said shield embodying pull tab means for initiating peeling removal of said shield, said dispenser comprising:

a housing providing a space in which one or more of said articles can be received in a stack one upon another, said housing having an opening, said stack being received in said housing with the tip ends of said first portions of each article extending outwardly through said opening, first pressing means carried in said housing and engageable with the uppermost article in said stack to apply compression to at least said remaining portions of the strips of each article, anchorage means in said housing, the shield tab means of each article being fixed to said anchorage means, each article being dispensable from said dispenser by means of a pulling force applied thereto at the first end portions thereof for sliding said article through said opening, said shield peeling from the remaining length portions of the strip to which it is adhered upon application of such pulling force, and second pressing means carried in said housing and engageable with the uppermost article in said stack at a location along the course of sliding travel of said uppermost article before it passes through said opening, said second pressing means applying a pressing force against said uppermost article to press said remaining portions of the strips thereof into face-to-face contact following the removal of the shield from therebetween but prior to exit of said remaining portions through the opening of said housing during dispensing.

2. The dispenser of claim 1 wherein said housing comprises an elongated structure having opposed top and bottom walls, and a pair of end walls extending between said top and bottom walls, the opening in said housing being formed in one of said end walls, said anchorage means being located adjacent the other of said end walls.

3. The dispenser of claim 2 wherein said first and second pressing means comprise spring biasing devices.

4. The dispenser of claim 3 wherein said anchorage means comprises at least one post upstanding from said bottom wall, the shield tab of each article being fixed to said post.

5. The dispenser of claim 4 wherein the first spring biasing device comprises a pressure plate overlying the remaining strip portions of the uppermost article in said stack in superposed positioning thereon, at least one spring finger connected with said compression plate and extending into engagement with the top wall of said housing for urging said pressure plate in the direction of said housing bottom wall and therewith apply compression to said stack, and means in said plate cooperating with said post for maintaining said pressure plate in said superposed positioning.

6. The dispenser of claim 4 wherein said second spring biasing device comprises an elongated blade spring positioned above said pressure plate and fixed at one end to said post, said blade spring at its other end being engaged with the uppermost article in said stack, said blade spring applying pressure downwardly of said stack and having a wiping bar at said other end for pressing the remaining portions of said strips together during the dispensing of each article.

7. The dispenser of claim 6 wherein the wiping bar at the other end of said blade spring is provided with a pad of resilient material fixed thereto, said pad engaging the uppermost article in said stack in a course transverse of the direction of sliding travel of said uppermost article and applying pressing force thereto uniformly across said transverse course.

8. The dispenser of claim 6 wherein the wiping bar of said blade spring locates in said opening.

9. The dispenser of claim 4 wherein the tab means of each article is provided with at least one opening therethrough, said post being received through said opening.

10. The dispenser of claim 2 wherein said bottom wall has an extension projecting a distance outwardly of said opening, the tip ends of said first portions of said articles being supported on said extension.

11. A package for disposable type thermometers comprising in combination with a plurality of thermometers each including at least two superimposed, coextensive strips joined in adhesive face-to-face contact along corresponding first portions of the length of each strip, the remaining portions of the length of said strips carrying components having an operative association when said remaining portions are pressed into face-to-face contact for detecting and indicating temperature values, said remaining portions normally being intervened by a shield peelably removably secured to the remaining portion of at least one of said strips preventing face-to-face contact of said remaining portions and the components carried on each of said remaining portions, said shield embodying pull tab means for initiating peeling removal of said shield, an elongated housing having opposed top and bottom walls and a pair of end walls extending between said top and bottom walls, said housing having an opening in one of said end walls, said thermometer being received in said housing in a stack thereof one upon another with the tip ends of said first portions of each thermometer extending outwardly of said housing through said opening, an anchorage post in said housing adjacent the other of said end walls, the shield pull tab means of each thermometer being fixed to said anchorage post, a plate received on the uppermost thermometer in said stack and overlying said remaining strip portions of said thermometer, said plate embodying a spring finger engageable with said top wall for urging said plate in the direction of said bottom wall thereby to apply a force of compression to said remaining portions, each thermometer being dispensable from said housing by means of a pulling force applied thereto at the first end portions thereof for sliding said thermometer through said opening, the shield of each thermometer peeling from the remaining length portion of the strip to which it is adhered upon application of such pulling force, and an elongated blade spring carried in said housing fixed at one end to said anchorage post and extending at its other end in the direction of said opening and terminating at said opening in a laterally widened wiping bar for engaging the uppermost thermometer and applying a pressing force against said remaining portions of the strips of each thermometer during dispensing thereof to press said remaining portions into face-to-face contact following the removal of the shield from therebetween but prior to exit of said remaining portions through the opening of said housing.

References Cited

UNITED STATES PATENTS

| 1,362,058 | 12/1920 | Swift | 221—26 |
| 1,657,737 | 1/1928 | Bogren | 221—26 X |
| 2,153,278 | 4/1939 | Shelley | 221—52 X |
| 3,189,219 | 6/1965 | Holzworth et al. | 221—280 X |

ROBERT F. BURNETT, Primary Examiner

J. C. GIL, Assistant Examiner

U.S. Cl. X.R.

161—406; 206—56 AC; 221—26